United States Patent
Kang et al.

(10) Patent No.: US 12,459,775 B2
(45) Date of Patent: Nov. 4, 2025

(54) APPARATUS FOR CUTTING SEPARATOR

(71) Applicant: LG Energy Solution, Ltd., Seoul (KR)

(72) Inventors: Yong Hyun Kang, Daejeon (KR); Sung Dong Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/276,344

(22) PCT Filed: Oct. 17, 2022

(86) PCT No.: PCT/KR2022/015756
§ 371 (c)(1),
(2) Date: Aug. 8, 2023

(87) PCT Pub. No.: WO2023/085625
PCT Pub. Date: May 19, 2023

(65) Prior Publication Data
US 2024/0124259 A1    Apr. 18, 2024

(30) Foreign Application Priority Data
Nov. 10, 2021 (KR) .................. 10-2021-0153806

(51) Int. Cl.
*B65H 35/06* (2006.01)
*H01M 10/04* (2006.01)
*H01M 50/406* (2021.01)

(52) U.S. Cl.
CPC ........ *B65H 35/06* (2013.01); *H01M 10/0404* (2013.01); *H01M 50/406* (2021.01);
(Continued)

(58) Field of Classification Search
CPC ........................ H01M 50/406; B65H 35/06
See application file for complete search history.

(56) References Cited

U.S. PATENT DOCUMENTS 4,026,000 A * 5/1977 Anderson ............. B29C 65/086
156/484
4,855,196 A * 8/1989 Eggers ................ H01M 50/491
29/623.3
(Continued)

FOREIGN PATENT DOCUMENTS

IN    112151726 A    12/2020
JP    S6132631 U    2/1986
(Continued)

OTHER PUBLICATIONS

International Search Report for PCT/KR2022/015756 mailed Feb. 3, 2023. 3 pages.

*Primary Examiner* — Sean M Michalski
(74) *Attorney, Agent, or Firm* — Lerner David LLP

(57) ABSTRACT

A separator cutting apparatus includes: a fixing part configured to fix temporarily the electrode assembly; a cutter supporting part disposed above the fixing part; a cutter part disposed below the cutter supporting part, and configured to cut a separator among the electrode assembly temporarily fixed to the fixing part; and a spring part configured to connect elastically the cutter supporting part and the cutter part to each other, and return the cutter part to an initial position after cutting the separator; the spring part includes a spring bush coupled to a supporting shaft provided in the cutter supporting part and the cutter part, respectively, a spring holder integrally coupled to the spring bush, and a spring that expands and contracts according to the elevation of the cutter part by coupling both ends to the spring holder, and the spring holder and the spring bush are made of a non-metallic material.

12 Claims, 8 Drawing Sheets

(52) U.S. Cl.
CPC ............ *B65H 2301/515326* (2013.01); *B65H 2402/54* (2013.01); *B65H 2402/60* (2013.01); *B65H 2701/18264* (2013.01); *B65H 2701/19* (2013.01)

(56) References Cited

U.S. PATENT DOCUMENTS

| | | | |
|---|---|---|---|
| 9,299,965 B2* | 3/2016 | Yuhara | ................... H01G 13/00 |
| 9,780,401 B2* | 10/2017 | Yuhara | ............... B29C 65/7841 |
| 2009/0011881 A1 | 1/2009 | Lehtovaara et al. | |
| 2014/0020238 A1* | 1/2014 | Yuhara | ................... H01G 13/00 |
| | | | 29/730 |
| 2014/0033883 A1* | 2/2014 | Yuhara | ................ B65H 29/241 |
| | | | 83/156 |
| 2014/0349192 A1 | 11/2014 | Park et al. | |
| 2020/0355233 A1 | 11/2020 | Chiba | |
| 2020/0406074 A1 | 12/2020 | Fjelldal | |

FOREIGN PATENT DOCUMENTS

| | | |
|---|---|---|
| JP | S6136737 U | 3/1986 |
| JP | 109217772 A | 8/1997 |
| JP | 2014170653 A | 9/2014 |
| JP | 2015513195 A | 4/2015 |
| JP | 2020183786 A | 11/2020 |
| KR | 20060027257 A | 3/2006 |
| KR | 20060076941 A | 7/2006 |
| KR | 20090040504 A | 4/2009 |
| KR | 101106337 B1 | 1/2012 |
| KR | 20120128166 A | 11/2012 |
| KR | 101791297 B1 | 10/2017 |
| KR | 101833470 B1 | 2/2018 |
| KR | 20180023230 A | 3/2018 |
| KR | 20190124544 A | 11/2019 |
| KR | 102237753 B1 | 4/2021 |

* cited by examiner

[FIG. 1]
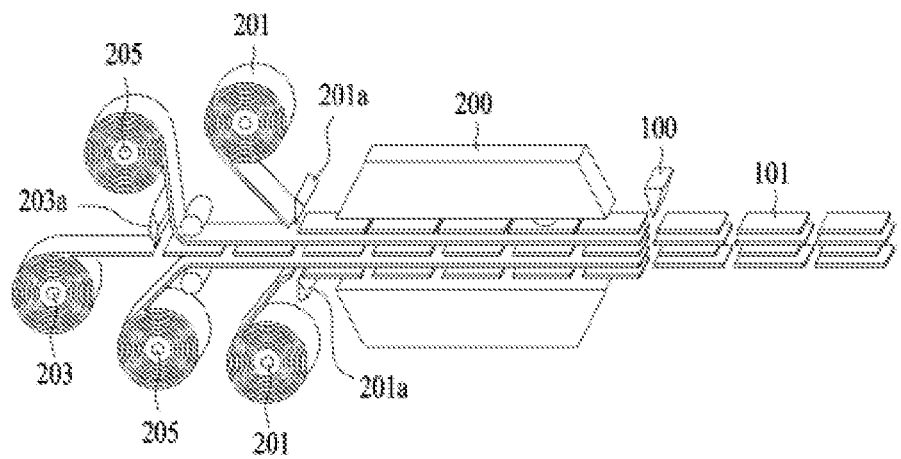
[FIG. 2]
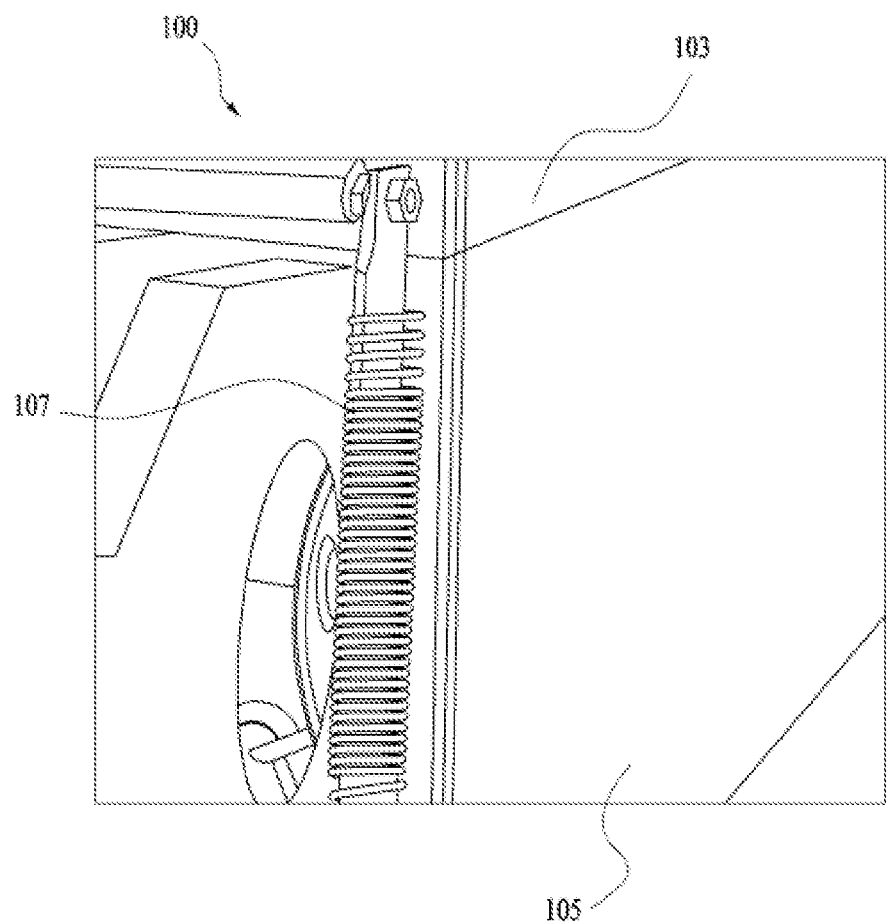

[FIG. 3]
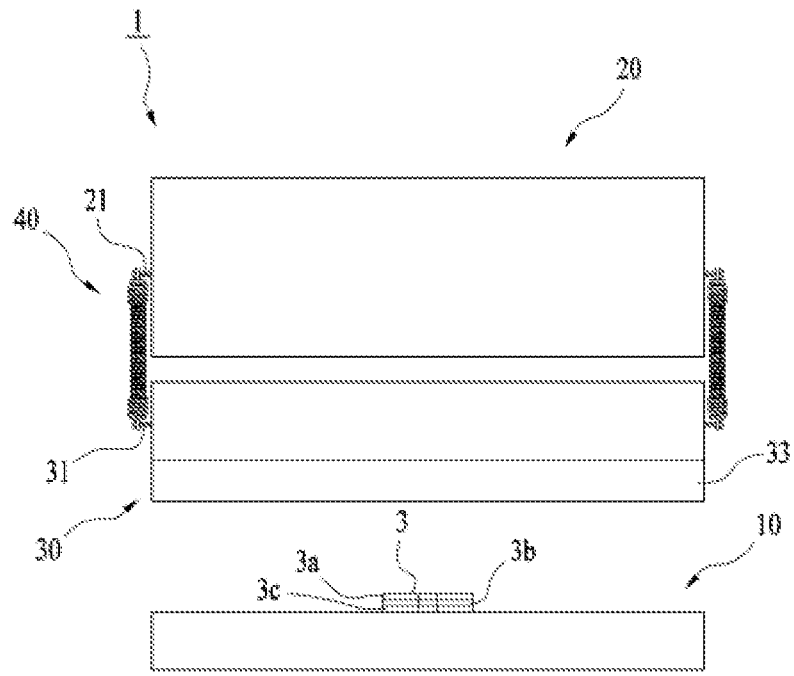
[FIG. 4]
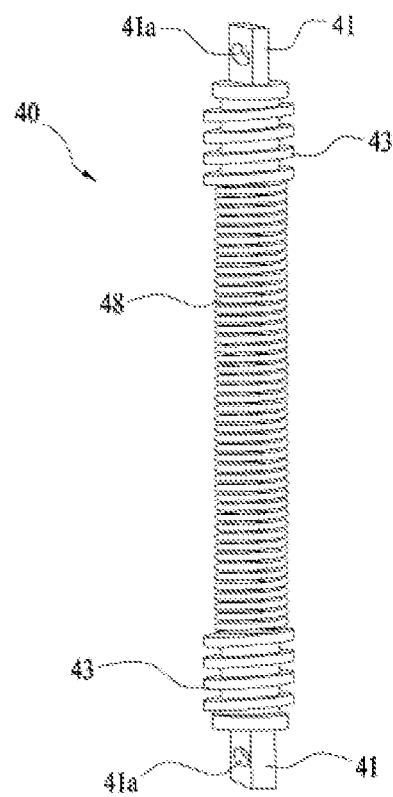

[FIG. 5]
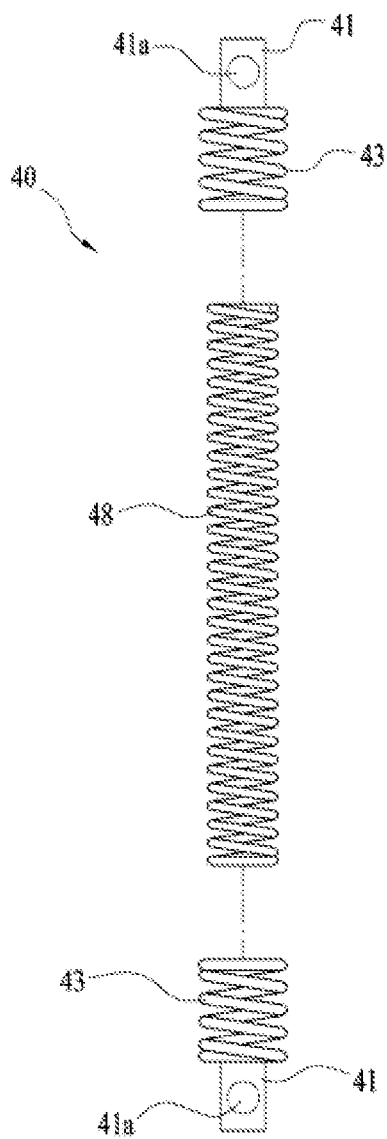

[FIG. 6]
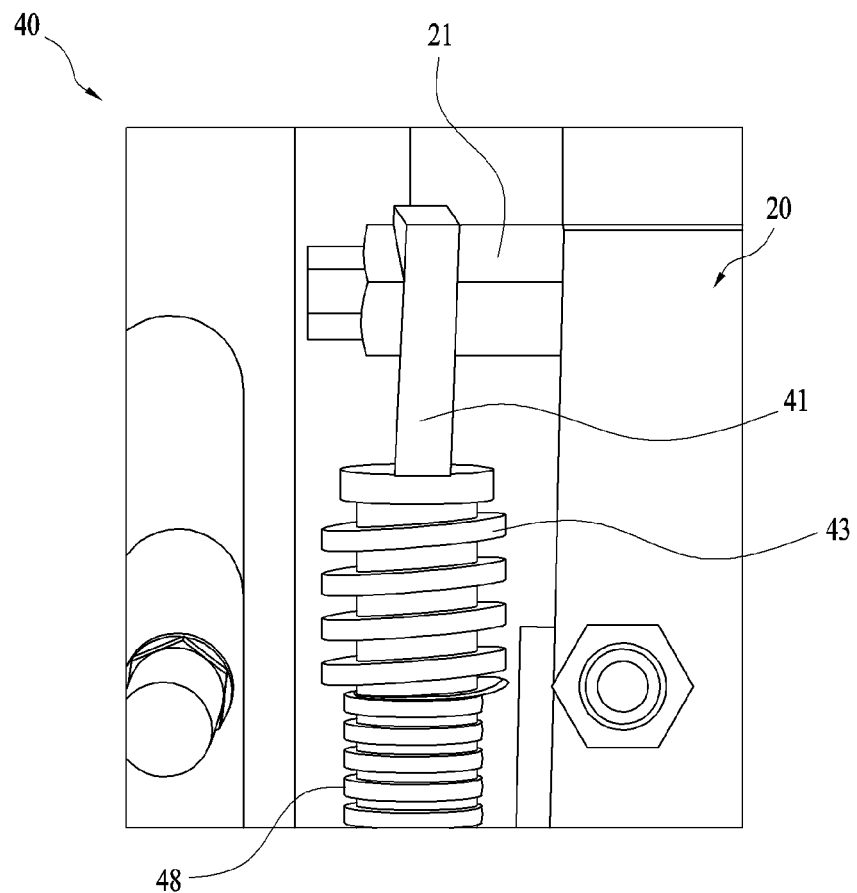

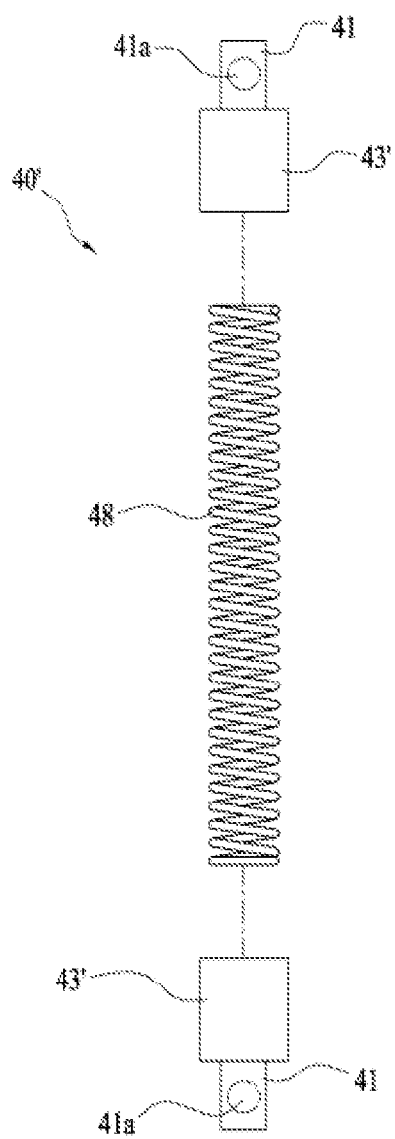
[FIG. 7]

[FIG. 8]
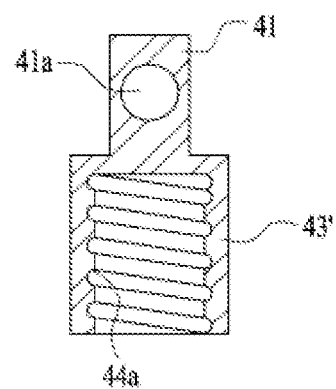

[FIG. 9]
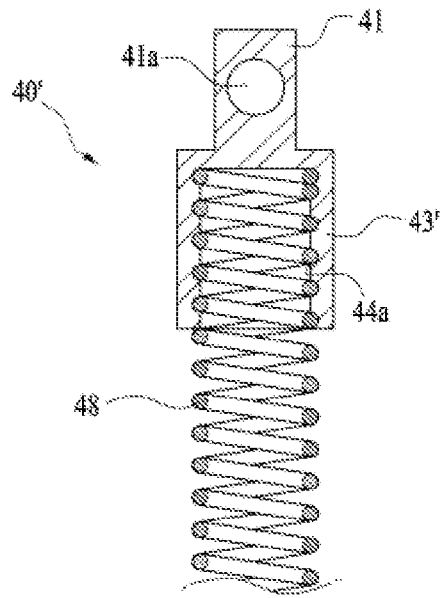
[FIG. 10]
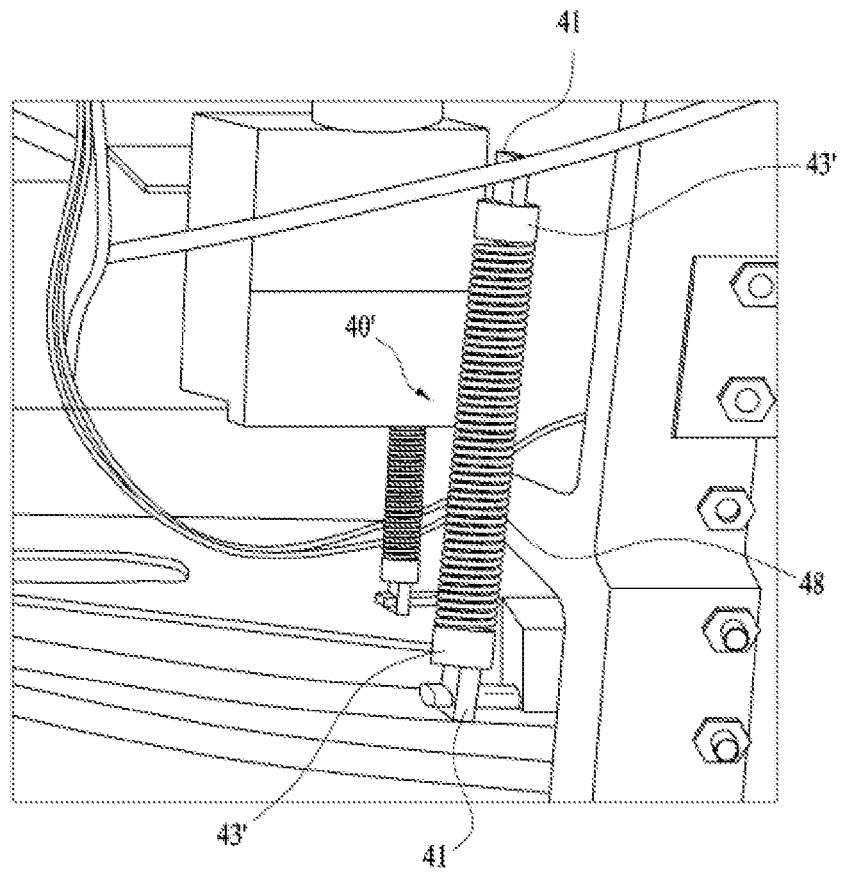

[FIG. 11]
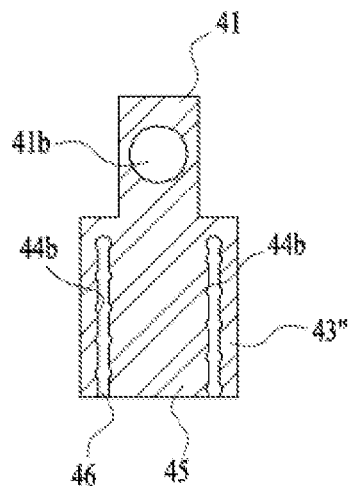
[FIG. 12]
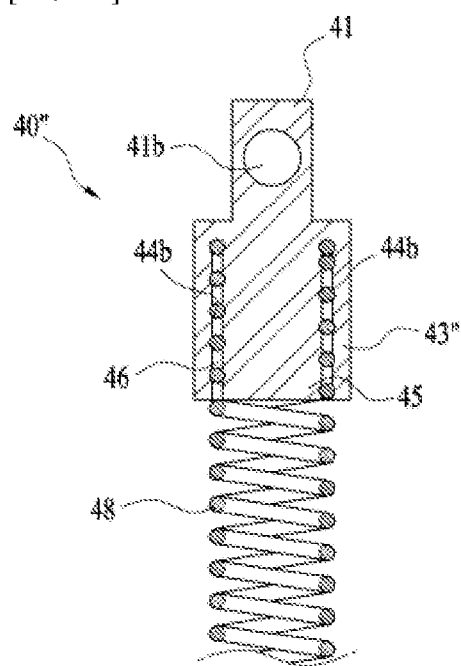

APPARATUS FOR CUTTING SEPARATOR

CROSS-REFERENCE TO RELATED APPLICATIONS

The present application is a national phase entry under 35 U.S.C. § 371 of International Application No. PCT/KR2022/015756, filed on Oct. 17, 2022, which claims the benefit of priority from Korean Patent Application No. 10-2021-0153806, filed on Nov. 10, 2021, all of which are incorporated herein by reference.

TECHNICAL FIELD

The present invention relates to a separator cutting apparatus.

More specifically, the present invention relates to the separator cutting apparatus capable of inhibiting friction with a surrounding metal by improving the structure of a spring part that returns a cutter that cuts the separator in a lamination process by elasticity.

In addition, the present invention relates to the separator cutting apparatus that can prevent the generation of a foreign substance due to friction with a surrounding metal by improving the spring part with a non-metallic material.

BACKGROUND ART

Recently, secondary batteries capable of charging and discharging are widely being used as a power source for wireless mobile devices.

In addition, secondary batteries are drawing attention not only as a power source for mobile devices such as mobile phones, smartphones, laptops, and camcorders, but also as a power source for electric vehicles and hybrid electric vehicles that are suggested as measures to solve air pollution caused by conventional gasoline vehicles and diesel vehicles that use fossil fuels.

Therefore, the kinds of application that use a secondary battery are being greatly diversified due to the advantages of the secondary battery, and the secondary battery is expected to be applied to various fields and appliances in the future than it is now.

Such secondary battery can be classified into a lithium-ion battery, a lithium-ion polymer battery, a lithium polymer battery, etc. depending on the composition of an electrode and electrolyte, and the usage of the lithium-ion polymer battery, which is easy to be manufactured and is less likely to have electrolyte leakage, has been increasing.

Generally, depending on the shape of the battery case, a secondary battery can be classified into a cylindrical battery and a prismatic battery each having an electrode assembly embedded into a cylindrical or a prismatic metal can, and a pouch-type battery electrode assembly embedded into a pouch-type case with an aluminum laminated sheet.

Also, the electrode assembly embedded into the battery case is capable of charging and discharging by being composed of a cathode, an anode, and a separator interposed between the cathode and the anode, and it is classified into a jelly-roll type that is wrapped after interposing a separator between a long sheet-type cathode and anode coated with an active material, and a stack type that sequentially stacks a plurality of cathode and anode with a predetermined size interposed onto the separator.

Here, because electric vehicles, etc. use a high-power electrical energy, they require a plurality of battery modules, and these battery modules have a plurality of battery cells connected in series or parallel on the inside.

These battery cells are manufactured by processes including a notching process that notches an electrode, a lamination process that laminates a notched electrode, a separator cutting process that cuts a separator in a laminated electrode assembly, a staking process and a pressing process, and a packaging process and a degassing process.

Here, as illustrated in FIG. 1, a cathode and an anode are supplied through a cathode supply roll 201 and an anode supply roll 203, and the cathode and the anode are supplied separately through respective cutting apparatuses 201a, 203a.

Also, the separator supplied through a separator supply roll 205 is interposed between the cathode and the anode, the cathode, the anode, and the separator are laminated through a lamination apparatus 200, and the separator is cut from a laminated electrode assembly 101 through the separator cutting apparatus 100 provided at the rear end of the lamination apparatus 200.

Such separator cutting apparatus 100, as illustrated in FIG. 2 includes a fixing part (not illustrated) to which an electrode assembly is fixed, a cutter supporting part 103, a cutter part 105 that cuts the separator, and a spring part 107 that returns the cutter part that cuts the separator to the initial position.

Here, both ends of the spring part 107 are connected to the cutter supporting part 103 and the cutter part 105, and the spring part 107 has a structure in which the cutter part 105, which has cut the separator on the fixing part, returns to the initial position due to the elasticity of the spring part 107.

In the spring part as described above, vibration occurs when the cutter part returns to the initial position after cutting the separator on the fixing part, and this causes friction to occur by coming into contact with a metal structure including a frame.

Here, since the spring part is made of a SUS material, a slipping phenomenon where it is broken or crushed into small pieces when it comes to contact with a metal structure including a frame, and as a result, the corresponding foreign material was introduced to the electrode assembly, causing problems such as short circuit defect and low voltage defect.

Therefore, there is a demand for an improved spring part structure that can minimize the generation of foreign substances through the spring part that returns the cutter to the initial position after cutting the separator on the fixing part, and thereby improve product quality.

RELATED ART

Patent Document (Patent Document 1) Korean Registered Patent Publication No. 10-1791297

Technical Problem

The present invention is directed to solving above-mentioned problems, and it is directed to providing a separator cutting apparatus that can inhibit friction with surrounding metals by improving the structure of a spring part that returns a cutter that has cut the separator during the lamination process through elasticity.

Also, the present invention is directed to providing the separator cutting apparatus that can prevent the generation of foreign substances due to friction with surrounding metals by improving the spring part into a non-metallic material.

Technical Solution

In order to solve the problems mentioned above, the present invention, a separator cutting apparatus of a lamination process of stacking an electrode assembly, includes: a fixing part configured to fix temporarily the electrode assembly to be transported; a cutter supporting part disposed above the fixing part; a cutter part disposed below the cutter supporting part and configured to cut a separator among the electrode assembly temporarily fixed to the fixing part; and a spring part configured to connect elastically the cutter supporting part and the cutter part to each other and return the cutter part to an initial position after cutting the separator; and wherein the spring part includes a spring bush coupled to a supporting shaft provided in the cutter supporting part and the cutter part, respectively, a spring holder integrally coupled to the spring bush, and a spring that expands and contracts according to the elevation of the cutter part by coupling both ends to a spring holder, and the spring holder and the spring bush are made of a non-metallic material.

As an example, the spring holder may be integrally with the spring bush.

As another example, the spring holder and the spring bush may be engineering plastics.

As a specific example, the spring holder and the spring bush may be made of polyether ether ketone (PEEK).

As an example, the spring holder may be a heli-coil type spiral holder.

As a specific example, both ends of the spring may be directly screwed into the heli-coil type spiral holder.

As another example, the spring holder may be a hollow cylindrical member integrally connected to the spring bush, and the end of the spring is tightly fixed to the inner surface of the hollow cylindrical spring holder.

As a specific example, a screw thread corresponding to a spiral of the spring may be provided on the inner surface of the hollow cylindrical spring holder.

As another specific example, the end of the spring may be directly screwed onto the screw thread.

As another example, the spring holder may be a hollow cylindrical member integrally connected to the spring bush, and a cylindrical protrusion may be provided at the center of the hollow cylindrical spring holder, and an end of the spring may be pressed and fixed by being inserted into an annular coupling groove provided in the inner space of the hollow cylindrical spring holder by the protrusion.

As a specific example, the screw thread corresponding to the spiral of the spring may be respectively provided on two opposing inner surfaces provided by the annular coupling groove.

As another specific example, the end of the spring is directly double screwed onto the screw thread.

Advantageous Effects

According to the present invention, improving the structure of the spring part of the separator may inhibit friction with surrounding metals, and improving the spring part to a non-metallic material may prevent the generation of foreign substances due to friction with surrounding metals.

Therefore, the present invention may prevent short circuit defect and low voltage defect due to the inflow of foreign substances into the electrode assembly, and it may improve product quality by minimizing the generation of foreign substances through the spring part.

BRIEF DESCRIPTION OF THE DRAWINGS

FIG. 1 is a process chart schematically illustrating a lamination process and a separator cutting process in a battery cell manufacturing process.

FIG. 2 is a diagram schematically illustrating the spring part of the separator cutting apparatus according to conventional art.

FIG. 3 is a diagram schematically illustrating the separator cutting apparatus according to the present invention.

FIG. 4 is a perspective view schematically illustrating the spring part according to an exemplary embodiment of the separator cutting apparatus according to the present invention.

FIG. 5 is a front view showing an exploded view of the spring part according to the present exemplary embodiment.

FIG. 6 is a diagram schematically illustrating a state in which the spring part is applied to the separator cutting apparatus according to the present exemplary embodiment.

FIG. 7 is a front view showing an exploded view of the spring part according to another exemplary embodiment of the separator cutting apparatus according to the present invention.

FIG. 8 is a front cross-sectional view schematically illustrating the spring bush and spring holder of the spring part according to the present exemplary embodiment.

FIG. 9 is a front cross-sectional view schematically illustrating a state in which the spring is coupled to the spring holder of the spring part according to the present exemplary embodiment.

FIG. 10 is a diagram schematically illustrating a state in which the spring part according to the present exemplary embodiment is applied to the separator cutting apparatus.

FIG. 11 is a front cross-sectional view schematically illustrating the spring bush and the spring holder of the spring part according to another exemplary embodiment of the separator cutting apparatus according to the present invention.

FIG. 12 is a front cross-sectional view schematically illustrating a state in which the spring is coupled to the spring holder of the spring part according to the present exemplary embodiment.

REFERENCE NUMERALS

1: SEPARATOR CUTTING APPARATUS
3: ELECTRODE ASSEMBLY
3a: CATHODE
3b: SEPARATOR
3c: ANODE
10: FIXING PART
20: CUTTER SUPPORTING PART
21: SUPPORTING SHAFT
30: CUTTER PART
31: SUPPORTING SHAFT
33: CUTTING KNIFE
40,40',40": SPRING PART
41: SPRING BUSH
41a: COUPLING HOLE
43,43',43": SPRING HOLDER
44a, 44b: SCREW THREAD
45: PROTRUSION
46: COUPLING GROOVE
48: SPRING

DETAILED DESCRIPTION OF THE PREFERRED EMBODIMENTS

The present invention, in terms of a separator cutting apparatus of a lamination process that stacks an electrode assembly, provides a separator cutting apparatus that comprises: a separator cutting apparatus of a lamination process of stacking an electrode assembly, the separator cutting apparatus, comprising: a fixing part configured to fix temporarily the electrode assembly to be transported; a cutter supporting part disposed above the fixing part; a cutter part disposed below the cutter supporting part, and configured to cut a separator among the electrode assembly temporarily fixed to the fixing part; and a spring part configured to connect elastically the cutter supporting part and the cutter part to each other, and return the cutter part to an initial position after cutting the separator; wherein the spring part includes a spring bush coupled to a supporting shaft provided in the cutter supporting part and the cutter part, respectively, a spring holder integrally coupled to the spring bush, and a spring that expands and contracts according to the elevation of the cutter part by coupling both ends to the spring holder, and the spring holder and the spring bush are made of a non-metallic material.

MODES OF THE INVENTION

Hereinafter, the present invention will be described in detail. First, the terms and the words used in this specification and claims should not be interpreted as limited to commonly used meanings or dictionary meanings, and should be interpreted with meanings and concepts which are consistent with the technological scope of the present invention based on the principle that the inventors have appropriately defined concepts of the terms in order to describe the present invention in the best way.

The terms "comprise," "include" and "have" used herein designate the presence of characteristics, numbers, steps, actions, components or elements described in the specification or a combination thereof, and it should be understood that the possibility of the presence or addition of one or more other characteristics, numbers, steps, actions, components, elements or a combination thereof is not excluded in advance.

In addition, when a part of a layer, a film, a region or a plate is disposed "on" another part, this includes not only a case in which one part is disposed "directly on" another part, but a case in which a third part is interposed therebetween. In contrast, when a part of a layer, a film, a region or a plate is disposed "under" another part, this includes not only a case in which one part is disposed "directly under" another part, but a case in which a third part is interposed therebetween. In addition, in the specification of the present invention, "on" may include not only a case of disposed on an upper part but also a case of disposed on a lower part.

First Embodiment

FIG. 3 is a diagram schematically illustrating the separator cutting apparatus according to the present invention. FIG. 4 is a perspective view schematically illustrating the spring part according to an exemplary embodiment of the separator cutting apparatus of the present invention. FIG. 5 is a front view showing an exploded view of the spring part according to the present exemplary embodiment. FIG. 6 is a diagram schematically illustrating a state in which the spring part is applied to the separator cutting apparatus according to the present exemplary embodiment.

As illustrated in FIG. 3, the separator cutting apparatus 1 according to the present invention includes a fixing part 10 to which the electrode assembly 3 is transferred, a cutter supporting part 20 disposed above of the fixing part 10, a cutter part 30 configured to cut the separator 3b and is disposed below the cutter supporting part 20, and a spring part 40 that returns the cutter part 30 that has cut the separator 3b to the initial position.

The fixing part 10 is for temporarily fixing the electrode assembly being transported, and it is a section in which cutting process of the separator in the electrode assembly 3 stacked with the cathode 3a, the anode 3c, and the separator 3b is being executed.

The cutter supporting part 20 is disposed above the fixing part 10, and it supports the cutter part 30 that cuts the separator 3b.

The cutter part 30 is disposed below the cutter supporting part 20, and it is vertically movable so that it can cut the separator 3b in the electrode assembly 3 transported to the upper surface of the fixing part 10.

The spring part 40 elastically connects the cutter supporting part 20 and the cutter part 30 to each other, and returns the cutter part 30 that has cut the separator 3b to the initial position.

For this purpose, a supporting shaft 21,31 that is provided in the cutter supporting part 20 and the cutter part 30, respectively, and both ends of the spring 48 are coupled to each supporting shaft 21,31 to return the cutter part 30 to the initial position after cutting the separator 3b.

Meanwhile, the spring part 40, as illustrated in FIG. 4 and FIG. 5, includes a spring bush 41 coupled to the supporting shaft 21,31 provided in the cutter supporting part 20 and the cutter part 30, respectively, a spring holder 43 integrally coupled to the spring bush 41, and a coil-shaped spring 48 that expands and contracts according to the elevation of the cutter part 30 by having both ends bound to the spring holder 43.

The spring bush 41 is bar-shaped, and a coupling hole 41a is respectively formed through penetration so as to be coupled to supporting shaft 21,31 respectively provided in the cutter supporting part 20 and the cutter part 30.

The spring holder 43 is coupled to the end of the spring bush 41, and is made of a heli-coil type spiral holder.

Both ends of the spring 48 are coupled to the spring holder 43, and it is made to be extended when the cutter part 30 is cutting a separator 3b on the fixing part 10, and contracted by elasticity after cutting the separator 3b so that the cutter part 30 can return to the initial position.

As illustrated above, both ends of the spring 48 are coupled to each spring holder 43, and each of the spring holder 43 can minimize the friction generated by the vibration of the cutter part 30 returning to the initial position after cutting the separator 3b and by the contact between the spring 48 and metal structure provided around the cutter part 30 by being installed on the cutter supporting part 20 and the supporting shafts 21,31 of the cutter part 30 by the spring bush 41.

Meanwhile, both ends of the spring 48 are directly screw connected to the heli-coil type spiral spring holder 43. In other words, the spring wire twisted into a spiral forming the spring 48 is screw connected while rotating along the continuous spiral space of the heli-coil type spring holder 43.

For this purpose, the helix orientation of the spring 48 and the helix orientation of the spring holder 43 are formed identically, and the spring wires at both ends of the spring 48 are screw connected to the spiral space of the spring holder 43 and are fixed on both sides.

Here, the spring holder 43 and the spring bush 41 are made of a non-metallic material. Having the spring holder 43 and the spring bush 41 made of a non-metallic material can prevent the generation of a metal foreign substance when the cutter part 30 comes into contact with a metal structure provided around the cutter part 30.

Here, while it is desirable that the spring holder 43 and the spring bush 41 are integrally formed, the spring holder 43 and the spring bush 41 may also be detachably coupled, and other various changes may be implemented.

Meanwhile, the spring holder 43 and the spring bush 41 are made of engineering plastics.

Preferably, the spring holder 43 and the spring bush 41 are made of polyether ether ketone (PEEK).

In an exemplary embodiment of the present invention, the spring holder 43 and the spring bush 41 are made of an engineering plastic material or polyether ether ketone (PEEK), but are not limited thereto and can be modified in various ways.

Hereinafter, the installation process of the spring part into the separator cutting apparatus according to an exemplary embodiment of the present invention will be briefly described by referring to FIG. 5 and FIG. 6.

First, the spring holder 43 integrally formed with the spring bush 41 is installed at both ends of the spring 48.

Here, as the spring 48 rotates along the inner continuous spiral space formed by the heli-coil type spring holder 43, the spirally twisted spring wire gets coupled, causing both to be screw connected together.

As such, after screw connecting the spring holder 43 to both ends of the spring 48, the spring bush 41 integrally coupled to each spring holder 43 is fastened to the supporting shaft 21,31 formed in the cutter supporting part 20 and the cutter part 30, respectively.

Here, when fastening the spring bush 41 to the respective supporting shaft 21,31 formed in the cutter supporting part 20 and the cutter part 30, the supporting shaft 21,31 is inserted to the coupling hole 41a of the spring bush 41, and it is fixed by fastening a fastening element (not illustrated) such as a nut to the supporting shaft 21,31.

Hereinafter, the operation process of the separator according to an exemplary embodiment of the present invention will be briefly described by referring to FIG. 6.

First, the laminated electrode assembly 3 is transferred to the upper surface of the fixing part 10 of the separator cutting apparatus 1 through a lamination apparatus.

The separator cutting apparatus 1 cuts the separator 3b in the electrode assembly 3 in which the cathode, 3a, the separator 3b, and the anode 3c are stacked.

In other words, when the electrode assembly 3 is transferred to the fixing part 10, the cutter part 30 provided in the lower part of the cutter supporting part 20 descends toward the upper surface of the fixing part 10 by a hydraulic or an electrical signal, and the cutting knife 33 of the cutter part 30 cuts the separator 3b of the electrode assembly 3 while contacting the upper surface of the fixing part 10.

Here, the spring bush 41 is coupled to the respective supporting shaft 21,31 in the cutter supporting part 20 and the cutter part 30, and the cutter part 30 descends toward the upper surface of the fixing part 10 as the spring 48 in which both ends are bound to the spring holder 43 integrally coupled to the spring bush 41 is extended, then the spring 48 contracts to return the cutter part 30 to the initial position after cutting the separator 3b.

Here, both ends of the spring 48 screw connected to the spring holder 43 do not expand or contract when the cutter part 30 is operating, and the rest of the spring 48 disposed outside the spring holder 43 is made to expand or contract when the cutter is operating.

Therefore, as both ends of the spring 48 screw connected to the spring holder 43, the elastic range of the spring 48 can be limited by the repetitive operation and vibration of the cutter part 30, minimizing contact between the spring 48 and surrounding metal structures.

In addition, because both ends of the spring 48 made of a metal material is screw connected to each spring holder 43 made of a non-metal material, when the cutter is in contact with surrounding metal structures by the repetitive operation and vibration of the cutter, the spring 48 is not in direct contact with surrounding metal structures, so there can be zero generation of metal foreign substances due to friction between metals.

Second Embodiment

FIG. 7 is a front view showing an exploded view of the spring part according to another exemplary embodiment of the separator cutting apparatus of the present invention. FIG. 8 is a front cross-sectional view schematically illustrating the spring bush and the spring holder of the spring part according to the present exemplary embodiment. FIG. 9 is a front cross-sectional view schematically illustrating a state in which the spring is coupled to the spring holder of the spring part according to the present exemplary embodiment. FIG. 10 is a diagram schematically illustrating a state in which the spring part according to the present exemplary embodiment is applied to the separator cutting apparatus.

As illustrated in FIG. 7 through FIG. 10, the spring part 40' according to the present exemplary embodiment is a hollow cylindrical member formed by being integrally connected with the spring holder 43' and the spring bush 41, and the end of the spring is tightly fixed to the inner surface of the hollow cylindrical spring holder 43'.

In other words, while the spring holder 43' of the spring part 40' according to the present exemplary embodiment is formed by being integrally connected with the spring bush 41, it is a cylindrical member having a hollow inside, and the end of the spring 48 is inserted into the hollow inner surface of the spring holder 43' and gets tightly fixed.

For this purpose, the screw thread 44a corresponding to the spiral of the spring 48 is formed on the inner surface of the hollow cylindrical spring holder 43', and the helix orientation of the spring 48 and the helix orientation formed in the spring holder 43' are identically formed.

By the structure as mentioned above, both ends of the spring 48 are directly screw connected and fixed to the screw thread 44a formed on the inner surface of the hollow of the spring holder 43' when coupling both ends of the spring 48 to the hollow of the spring holder 43'.

Third Embodiment

FIG. 11 is a front cross-sectional view schematically illustrating the spring bush and the spring holder of the spring part according to another exemplary embodiment of the separator cutting apparatus of the present invention. FIG. 12 is a front cross-sectional view schematically illustrating a state in which the spring is coupled to the spring holder of the spring part according to the present exemplary embodiment.

As illustrated in FIG. 11, the spring part 40" according to the present exemplary embodiment is a hollow cylindrical member in which the spring holder 43" is integrally connected with the spring bush 41, and a cylindrical protrusion 45 is provided at the center of the hollow cylindrical spring holder 43", and the end of the spring 48 is inserted, pressurized, and fixed to the annular coupling groove 46 formed in the inner space of the cylindrical spring holder 43" by the protrusion 45.

In other words, the spring holder 43" according to the present exemplary embodiment is a cylindrical member having a hollow inside, is formed by being integrally connected with the spring bush 41, and has a cylindrical protrusion 45 protruding from the center of the hollow of the spring holder 43".

Also, the annular coupling groove 46 is formed in the inner space between the circumferential surface of the protrusion 45 and the inner surface of the hollow opposing to the circumferential surface, and the end of the spring 48 is inserted, pressurized, and fixed into the annular coupling groove 46.

Meanwhile, while the annular coupling groove 46 is formed, the screw thread 44b corresponding to the spiral of the spring 48 is respectively formed on two opposing inner surfaces. In other words, the screw thread 44b is formed on the circumferential surface of the protrusion 45 of the spring holder 43", and the screw thread 44b is formed on the hollow inner surface of the spring holder 43" opposing to the circumferential surface of the protrusion 45.

Likewise, the helix orientation of the screw thread 44b formed in the annular coupling groove 46 formed in the spring holder 43 and the helix orientation of the spring 48 are formed identically.

By the structure as mentioned above, as illustrated in FIG. 12, the end of the spring 48 is directly double screw connected to the screw thread 44b formed in the annular coupling groove 46.

As a modified example, the screw thread 44b corresponding to the spiral of the spring 48 is formed on the circumferential surface of the protrusion 45 among the two mutually opposing inner surfaces forming the annular coupling groove 46 of the spring holder 43", and it is also possible to have the end of the spring 48 screw connected to the coupling groove 46.

In addition, as another modified example, the screw thread 44b corresponding to the spiral of the spring 48 is formed on the inner surface of the hollow among the two mutually opposing inner surfaces forming the annular coupling groove 46 of the spring holder 43", and it is also possible to have the end of the spring 48 screw connected to the coupling groove 46.

As above, the present invention has been described with reference to exemplary embodiments, but it should be understood by those skilled in the art or those of ordinary skill in the art that the present invention can be variously modified and changed without departing from the spirit and technical scope of the present invention described in the accompanying claims.

The invention claimed is:

1. A separator cutting apparatus of a lamination process of stacking an electrode assembly, the separator cutting apparatus comprising:

a fixing part configured to temporarily fix the electrode assembly;

a cutter supporting part disposed above the fixing part;

a cutter part disposed below the cutter supporting part and above the fixing part, the cutter part configured to cut a separator of the electrode assembly on the fixing part; and a spring part elastically connecting the cutter supporting part and the cutter part to each other, the spring part configured to return the cutter part to an initial position after cutting the separator, wherein the spring part includes two spring bushes coupled to a supporting shaft extending from the cutter supporting part and a supporting shaft extending from the cutter part, respectively, two spring holders coupled to the two spring bushes, respectively, and a spring having two opposite ends coupled to the two spring holders, respectively, the spring configured to expand and contract according to an elevation of the cutter part relative to the cutter supporting part, and the spring holders and the spring bushes are each made of a non-metallic material.

2. The separator cutting apparatus of claim 1, wherein each spring holder is integrally formed with a respective one of the spring bushes.

3. The separator cutting apparatus of claim 1, wherein each spring holder and each spring bush are made of engineering plastics.

4. The separator cutting apparatus of claim 3, wherein each spring holder and each spring bush are made of a polyether ether ketone (PEEK).

5. The separator cutting apparatus of claim 1, wherein each spring holder is a heli-coil type spiral holder.

6. The separator cutting apparatus of claim 5, wherein each end of the spring is directly screwed into a respective one of the heli-coil type spiral holders.

7. The separator cutting apparatus of claim 1, wherein each spring holder is a hollow cylindrical member integrally connected to a respective one of the spring bushes, and each end of the spring is tightly fixed to an inner surface of a respective one of the hollow cylindrical members.

8. The separator cutting apparatus of claim 7, wherein each hollow cylindrical member defines a screw thread therein configured to mate with a spiral shape of a respective end of the spring.

9. The separator cutting apparatus of claim 8, wherein each end of the spring is directly screwed onto the screw thread of a respective one of the hollow cylindrical members.

10. The separator cutting apparatus of claim 1, wherein each spring holder is a hollow cylindrical member integrally connected to a respective one of the spring bushes, and each hollow cylindrical member has a cylindrical protrusion is provided at a center thereof, and each end of the spring is pressed and fixed into an annular coupling groove extending around the protrusion of a respective one of the hollow cylindrical members.

11. The separator cutting apparatus of claim 10, wherein each hollow cylindrical member defines a screw thread therein configured to mate with the spiral shape of the spring, each screw thread extending into opposing inner surfaces of the respective annular coupling groove.

12. The separator cutting apparatus of claim 11, wherein each end of the spring is directly double screwed into a respective one of the screw threads.

* * * * *